United States Patent [19]

Vanderslice, Jr. et al.

[11] Patent Number: 5,362,942
[45] Date of Patent: Nov. 8, 1994

[54] BATTERY HEATING SYSTEM USING INTERNAL BATTERY RESISTANCE

[75] Inventors: William T. Vanderslice, Jr., Norristown; Christopher J. Scafidi, Downingtown, both of Pa.

[73] Assignee: InterDigital Technology Corporation, Wilmington, Del.

[21] Appl. No.: 110,891

[22] Filed: Aug. 24, 1993

[51] Int. Cl.⁵ .......................... H02J 7/00; H05B 3/60
[52] U.S. Cl. .................................... 219/209; 219/201; 320/35; 429/120; 429/62
[58] Field of Search ............... 219/209, 210, 202, 200, 219/201; 429/120, 62; 320/35, 36, 31

[56] References Cited

U.S. PATENT DOCUMENTS

| | | | |
|---|---|---|---|
| 2,442,380 | 6/1948 | Schrodt et al. | 429/120 |
| 2,679,549 | 5/1954 | Rezek et al. | 429/120 |
| 2,710,936 | 6/1955 | Lowry et al. | 219/209 |
| 2,710,937 | 6/1955 | Godshalk et al. | 320/35 |
| 3,264,546 | 8/1966 | Foster | 320/35 |
| 3,617,850 | 11/1971 | Domshy | 320/35 |
| 3,656,045 | 4/1972 | Frezzolini et al. | 320/34 |
| 4,025,861 | 5/1977 | Godard et al. | 320/35 |
| 4,171,508 | 10/1979 | Sinclair | 429/120 |
| 4,222,000 | 9/1980 | Silvertown et al. | 320/35 |
| 4,667,140 | 5/1987 | Sweetman | 320/35 |
| 4,692,682 | 9/1987 | Lane et al. | 320/35 |
| 4,762,978 | 8/1988 | Tanis | 219/209 |
| 4,847,468 | 7/1989 | Hufstetler | 219/203 |
| 4,926,106 | 5/1990 | Tanis | 320/35 |
| 5,055,656 | 10/1991 | Farah | 219/209 |
| 5,082,075 | 1/1992 | Karolek | 180/68.2 |
| 5,252,411 | 12/1993 | Yokokawa et al. | 320/36 |

*Primary Examiner*—Bruce A. Reynolds
*Assistant Examiner*—John A. Jeffery
*Attorney, Agent, or Firm*—Robert S. Bramson; Nicholson Pine; Alan J. Jacobson

[57] ABSTRACT

A battery heater uses the internal resistance of the battery as the battery heating element. In one embodiment, a DC battery charger and a programmable battery load, is used in a closed loop temperature control system. In another embodiment, a DC battery charger and a resistor or small auxiliary battery heater, is used in a closed loop temperature control system. The programmable load or the small auxiliary battery heater, is enabled during full charge, low temperature conditions. The resistor or small auxiliary heater serves to both heat the battery and draw down the battery charge. In yet another embodiment, an AC heater power supply and a DC battery charger, is coupled to the battery in a closed loop temperature control system.

8 Claims, 6 Drawing Sheets

5,362,942

BATTERY HEATING SYSTEM USING INTERNAL BATTERY RESISTANCE

FIELD OF THE INVENTION

The present invention relates to the field of battery heating systems for maintaining minimum battery temperature.

BACKGROUND OF THE INVENTION

Many systems require a backup battery to maintain system operation in the event of the loss of primary power. For example, in radio telephone equipment, where the link (also called a modular cluster) between telephone subscribers and the central switch is a wireless local loop, it is desired that telephone service be maintained in the event of primary power failure. A radio telephone system of a type for use with a backup battery is illustrated in U.S. Pat. No. 4,675,863. If primary AC power fails, the backup battery is used to maintain uninterrupted telephone service. To be useful, the backup battery must be maintained in a fully charged and operational condition to be ready in the event of primary AC power failure.

In the prior art, backup battery readiness is maintained by a continuous battery charger and a battery heater. The battery charger senses battery charge, and maintains a full battery charge without overcharging the battery. Following a primary AC power failure, when AC power is restored, the battery charger restores the battery to full charge. Similarly, if charge leaks off the battery with time, the battery charger periodically restores the battery to full charge.

Battery efficiency falls off dramatically at low temperatures. That is, if the backup battery is too cold, it will not operate the equipment for very long in the event of primary AC power failure, even if the battery is fully charged. Therefore, in addition to maintaining full battery charge, it is necessary to heat the battery to a high enough temperature to maintain backup battery power readiness.

In the prior art, the battery heater is typically a resistive heating element in close proximity to the battery. The heating element is controlled in a closed loop temperature control system. If the sensed battery temperature falls below some minimum lower level (e.g. 0 degrees centigrade), the battery heating element is enabled. When the sensed battery temperature rises above that level, the battery heating element is disabled. Thus, in cold weather, the battery temperature is maintained to a minimum of 0 degrees centigrade.

SUMMARY OF THE INVENTION

The present invention is embodied in a method and apparatus in which the internal resistance of the battery is used as the heating element for maintaining battery temperature. In such manner, the need for a separate battery heater is reduced or eliminated entirely. An additional advantage of this invention is that battery heat is generated inside the battery where it needs to be, rather than in air or materials located outside the battery, as in the prior art.

In one embodiment, a DC battery charger is used to heat the battery in a closed loop temperature control system. In such manner, the internal battery resistance is used as the battery heating element. To provide for continuous battery heating at low temperatures without overcharging the battery, a programmable external battery load (which can be the backup powered equipment itself) is provided. When the battery is at full charge, under low temperature conditions, the programmable battery load is controlled so that battery charge is deliberately drawn down. That is, at low temperature, the programmable battery load drains battery charge. After the battery charge is partially depleted, the programmable battery load is removed, and the DC battery charger is enabled. Charging also heats the battery while restoring it to full charge, and the discharge/heating cycle repeats.

In an alternate embodiment, a resistor or a small auxiliary battery heater is used as a battery load to deliberately draw down the battery charge at full charge, low temperature conditions. That is, at low temperature, the small auxiliary heater is enabled to drain battery charge and heat the battery. After the battery charge is partially depleted, the auxiliary heater is disabled, and the DC charger is enabled. Charging heats the battery, restoring it full charge, and the discharge/heat, charge/heat cycle repeats. Thus, the resistor or small auxiliary heater serves to both heat the battery and draw down the battery charge.

In yet another embodiment, an AC heater power supply heats the battery using the internal resistance of the battery as the heating element for maintaining battery temperature between an upper and lower level in a closed loop temperature control system. Passing AC current through the battery provides no net battery charge or discharge, but heats the battery through power dissipated in the internal battery resistance. The AC heater power supply is enabled when the sensed temperature falls below the lower level temperature. As the battery temperature rises above the upper level, the AC heater power supply is disabled. In such manner, battery temperature is maintained above a desired minimum.

DETAILED DESCRIPTION OF THE INVENTION

Figure 1:
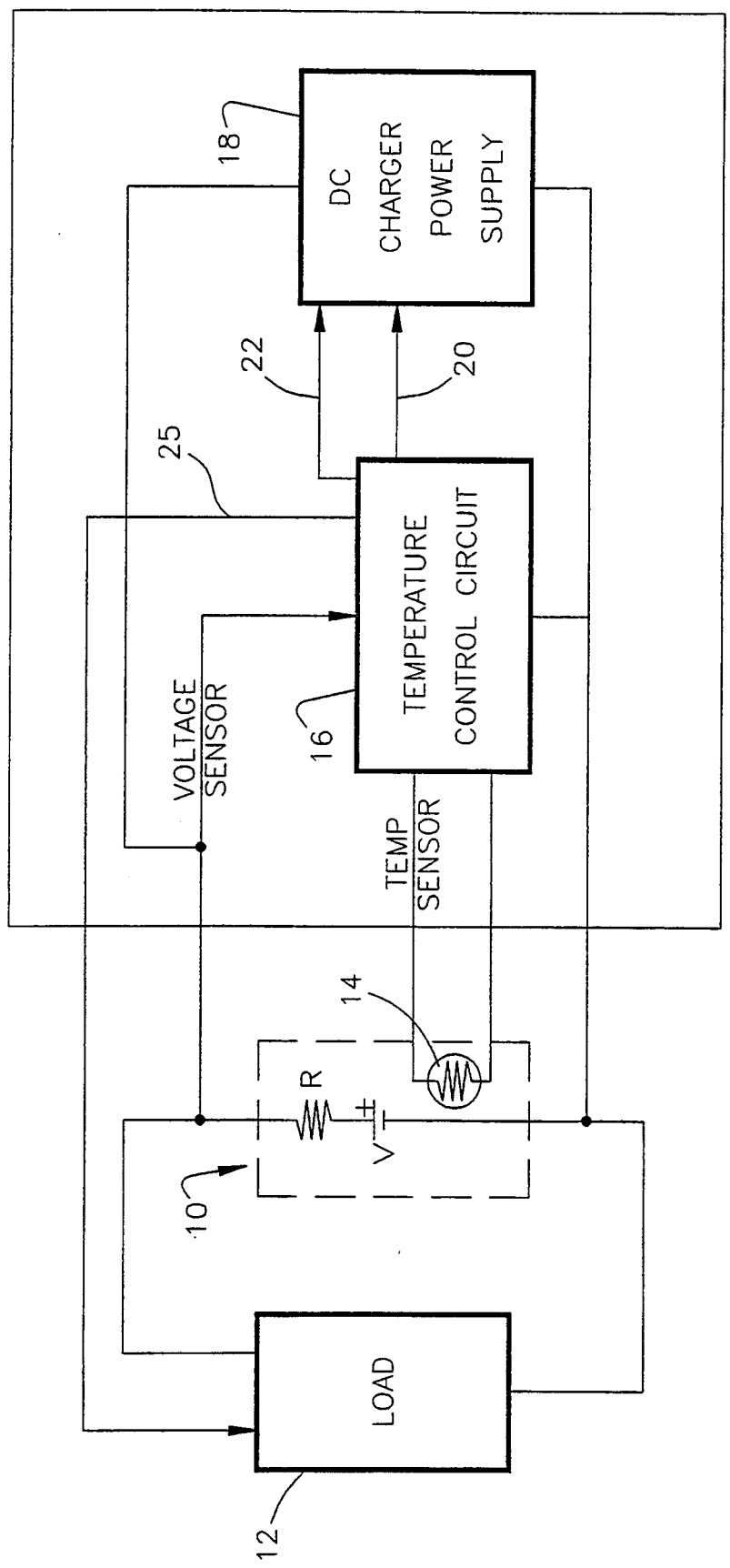
FIG. 1 is a block diagram of one embodiment of the invention, illustrating a battery charging and heating system with a temperature controller, a DC charger and a programmable load.
Figure 6:
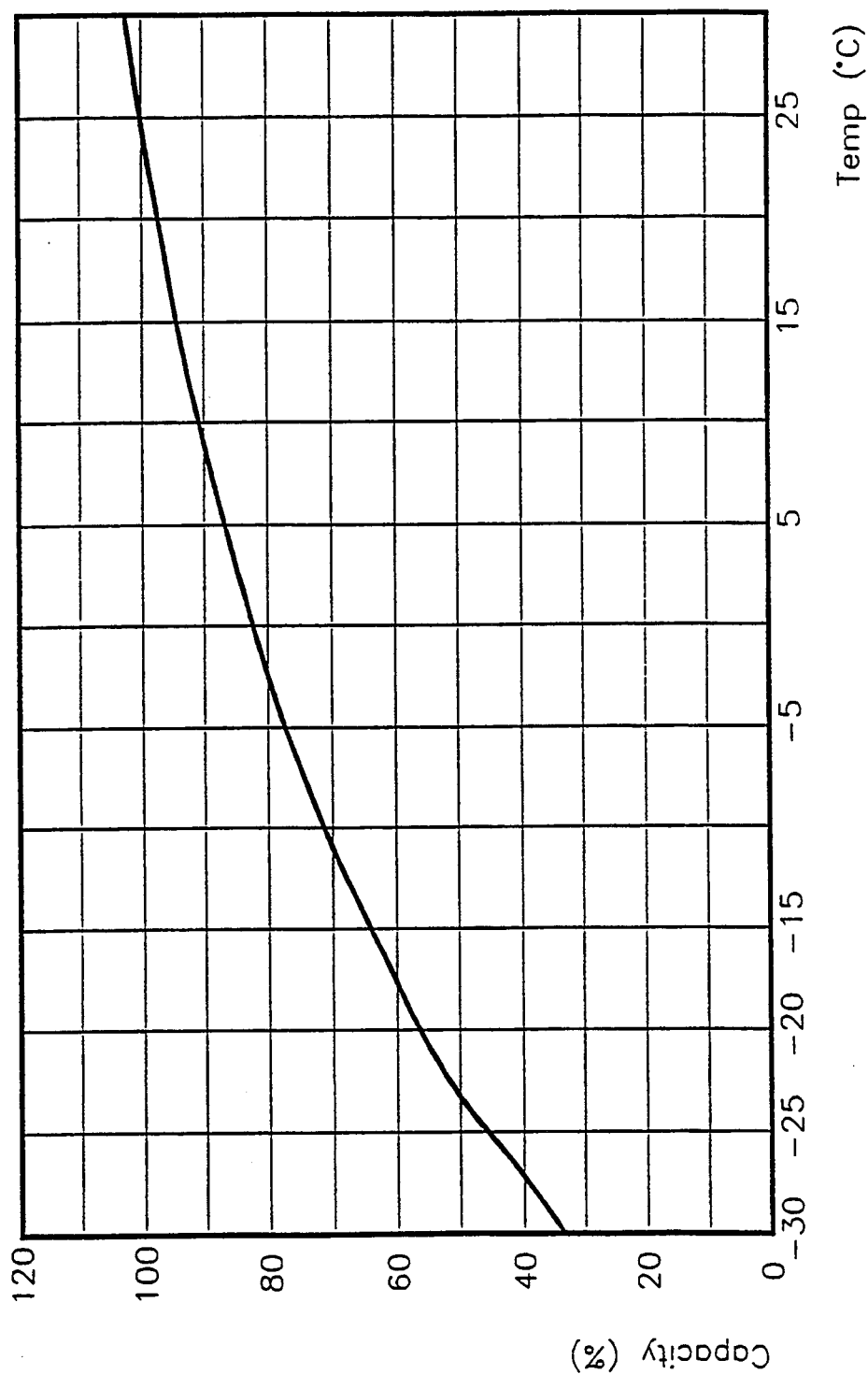
FIG. 6 is a graph of typical battery capacity as affected by temperature.

A battery charging and heating system is shown in FIG. 1. Battery 10 is preferably of the sealed, lead-acid type. Generally, a battery 10 may be represented as the series connection of an ideal voltage source V and an internal resistance R. In this model, R is not a conventional fixed resistor. The value of R depends on many conditions, for example the state of charge of the battery and temperature, and it is used to model battery charging and discharging efficiency. FIG. 6 illustrates a typical variation of battery capacity with battery temperature. A temperature sensor 14 is attached to the battery 10. A programmable load 12 with two dissipative states is connected in parallel with battery 10. A temperature controller 16 and a conventional DC battery charger 18 are also connected in parallel with battery 10. The temperature controller is coupled to temperature sensor 14. DC charger 18 is preferably a constant voltage, limited current source which is enabled by an internal comparator circuit whenever the voltage of battery 10 falls below a predetermined value. DC charger 18 also has two control inputs: a high/low rate charge rate control input 20, and a charger enable control input 22, respectively connected to temperature controller 16. A primary power source, such as a 120 VAC power source (not shown) provides power for all operations, and particularly serves as the primary power source for DC charger 18.

Figure 5:
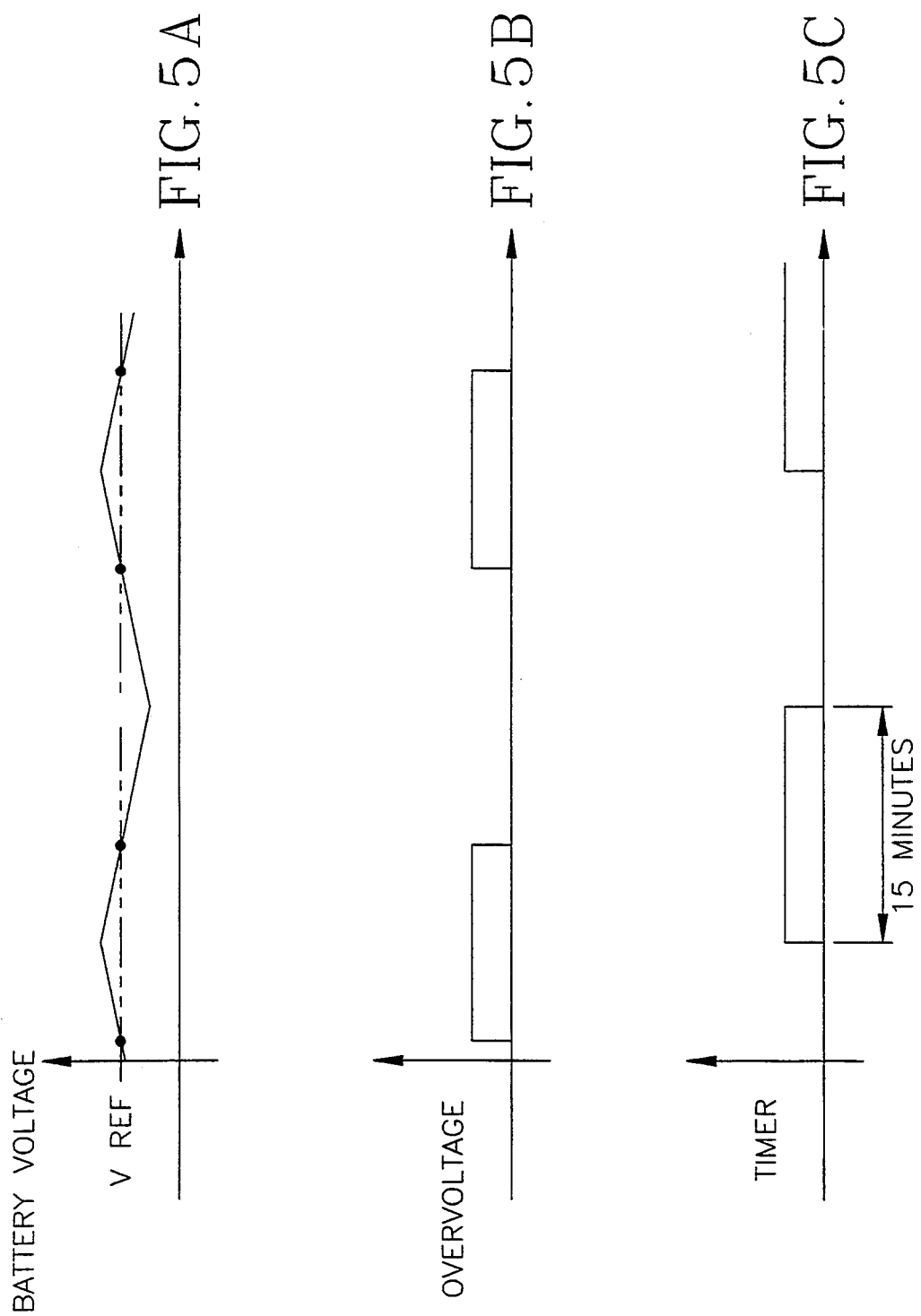
FIG. 5A is a timing diagram illustrating battery voltage for the system of FIGS. 1, 2 and 3.
FIG. 5B is a timing diagram illustrating the output of the battery voltage comparator 36 of FIG. 4.
FIG. 5C is a timing diagram illustrating the output of the timer 44 of FIG. 4.

The system of FIG. 1 operates in three modes, according to the temperature of sensor 14. In the first mode, when the temperature is less than approximately 0 degrees centigrade, a control output 25 of temperature controller 16 places programmable load 12 into its high power dissipative state. Temperature controller 16 sets DC charger 18 to a high rate of charge using the high/low rate limit input 20. The charger is cyclically enabled by temperature controller 16 via the charger's enable input 22, in a periodic cycle of approximately 30 minutes duration, as illustrated in FIGS. 5A, 5B and 5C. During a discharge half cycle with a duration of approximately 15 minutes, the DC charger 18 is disabled and load 12 draws current through battery 10, heating internal resistance R and battery 10. During a subsequent charge cycle of approximately 15 minutes duration, battery 10 is recharged by DC charger 18, which causes current to flow through resistor R in a direction opposite to that of the discharge cycle, which also heats resistor R and battery 10.

In the second mode, when the temperature of sensor 14 is between approximately 0 and 45 degrees centigrade, the control output 25 of temperature controller 16 places programmable load 12 into a low power dissipative state to conserve energy. Temperature controller 16 sets DC charger 18 to a high rate of charge using its input 20. The charger is continuously enabled to conventionally charge battery 10 as needed, and continuously supply current to load 12.

In the third mode, when the temperature of sensor 14 is above approximately 45 degrees centigrade, temperature controller 16 limits DC charger 18 to a low rate of charge using its input 20, to minimize battery heating and degradation. In other aspects, the third mode of operation for the system of FIG. 1 is identical to the second mode. The programmable feature of load 12 (i.e., the two dissipative states selected by control 25), may be eliminated if battery 10 is connected a load which draws sufficient power on a continuous basis to permit DC charger 18 to heat battery 10 without overcharging under all temperature conditions.

Figure 2:
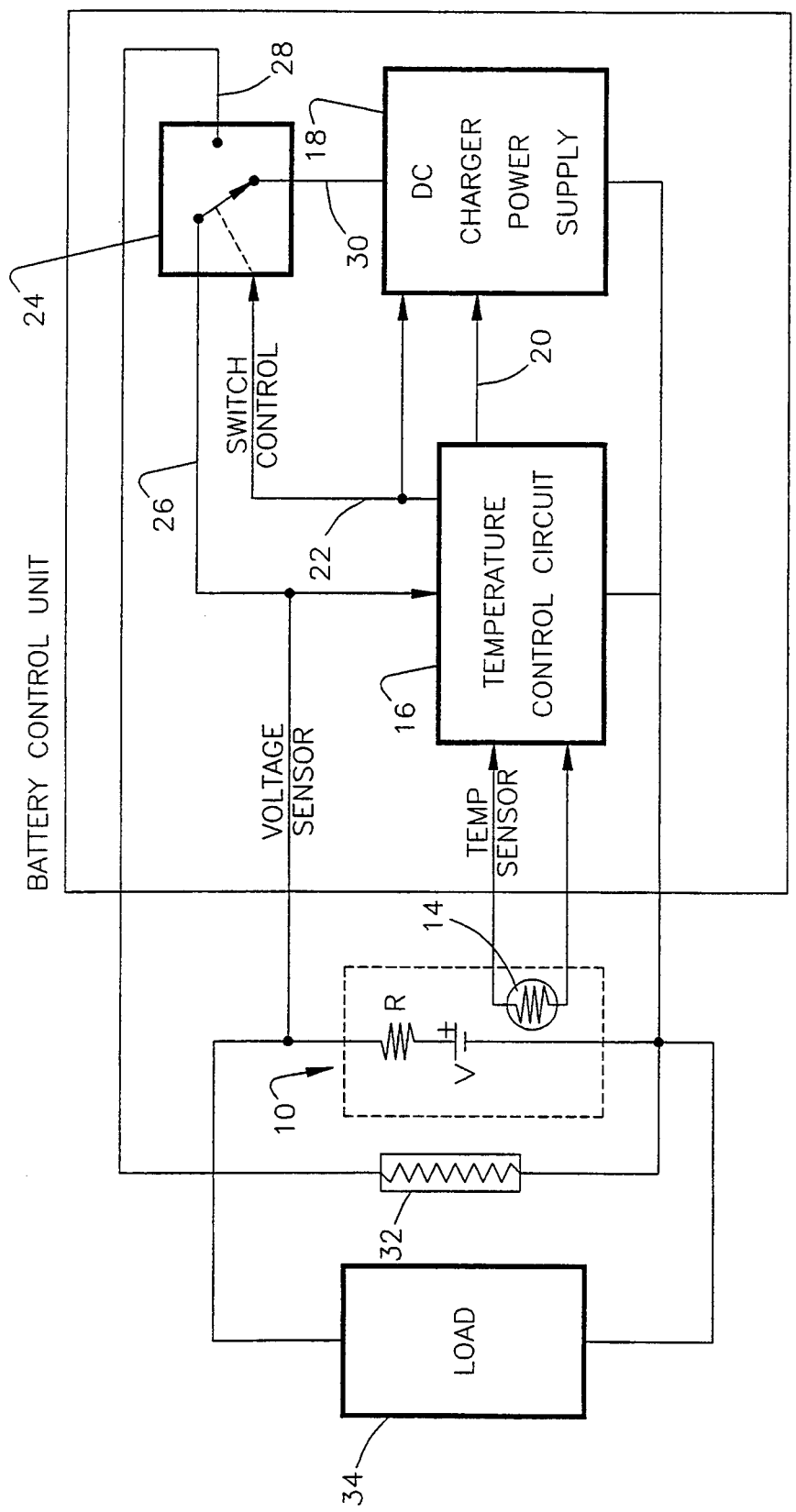
FIG. 2 is a block diagram of another embodiment of the invention, illustrating a battery charging and heating system with a separate external load to facilitate battery heating.

FIG. 2 illustrates an alternate embodiment of the invention, which is useful if a battery load 34 is not programmable or is not continuously dissipative, as for example, when maintaining backup battery readiness in an automobile or small aircraft which is not in operation. In this embodiment, additional load current is dissipated by a resistor 32, preferably a small auxiliary heater mounted in thermal contact with battery 10. The charger enable output 22 of temperature controller 16 is also connected to a control input of a switch 24, having a control input coupled to conductor 22 and terminals 26, 28 and 30, which alternately connect either a resistor 32, or a DC charger 18 to battery 10, to provide a programmable load on the battery 10 in a similar manner as the selective loading provided by the programmable load 12 of FIG. 1.

In particular, in a first mode of operation, switch 24 connects resistor 32 to the terminals of battery 10 through terminals 26 and 28. Battery 10 discharges some of its charge level through resistor 32, which also heats the battery 10. During discharge, DC charger 18 is disconnected from battery 10 by switch 24. In second and third modes of operation, switch 24 connects DC charger 18 to battery 10 through terminals 26 and 30 to heat the battery 10. During heating and charging in the second and third modes, resistor 32 is disconnected from battery 10.

Figure 3:
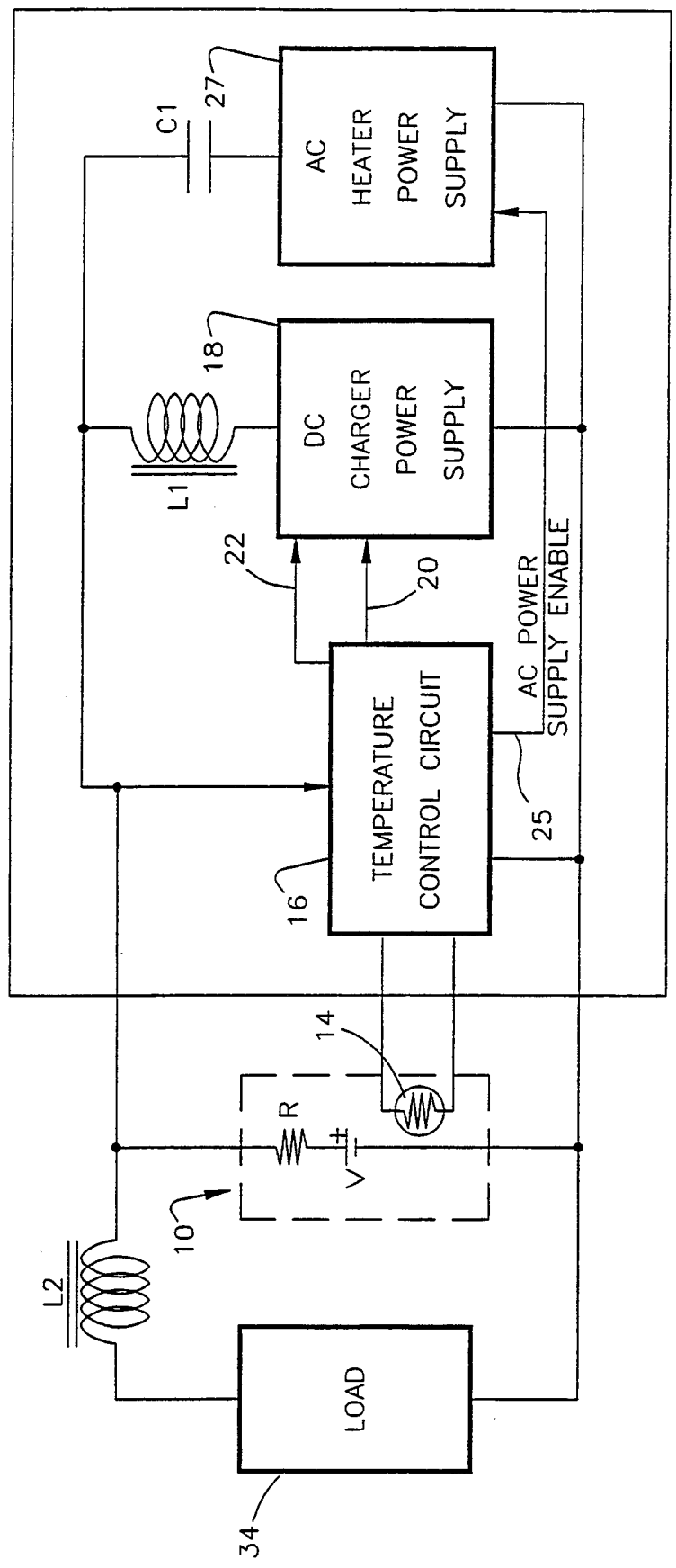
FIG. 3 is a block diagram of a third embodiment of the invention, illustrating a battery charging and heating system which uses an AC component of charging current to heat a battery.

FIG. 3 illustrates another embodiment of the invention, in which an AC heater power supply 27 provides alternating current (AC) to heat battery 10. AC current flow is provided through blocking capacitor C1 to the internal resistor R of battery 10. The AC current is in effect a ripple current deliberately introduced for the purpose of battery heating. In prior art, any AC ripple current has been deliberately minimized. In this embodiment, the DC charger 18 is always enabled by connecting the control input on conductor 22 to a fixed logic level internal to temperature controller 16.

Blocking inductors L1 and L2 isolate DC charger 18 and load 34 from the AC component of the charging voltage, thereby ensuring proper operation of the DC charger and avoiding possible damage or interference to load 34. AC heater power supply 27 is a low-impedance, low voltage, high current AC voltage source, such as the secondary of a low-voltage, high current transformer, preferably at a frequency of between 60 Hz and 500 Khz. Higher frequencies are preferable to minimize the size of capacitor C1, inductors L1 and L2, and may maximize the real part of the impedance of resistor R, for example, by the well-known high frequency skin effect of electrical conductors.

In operation, AC heater power supply 27 is enabled by a control signal on conductor 25, when temperature sensor 14 and temperature controller 16 indicate a battery temperature below a predetermined lower level. AC heater power supply 27 thus heats battery 10. AC heater power supply 27 is disabled by a control signal on conductor 25, when temperature sensor 14 and temperature controller 16 indicate a battery temperature above a predetermined upper level.

Figure 4:
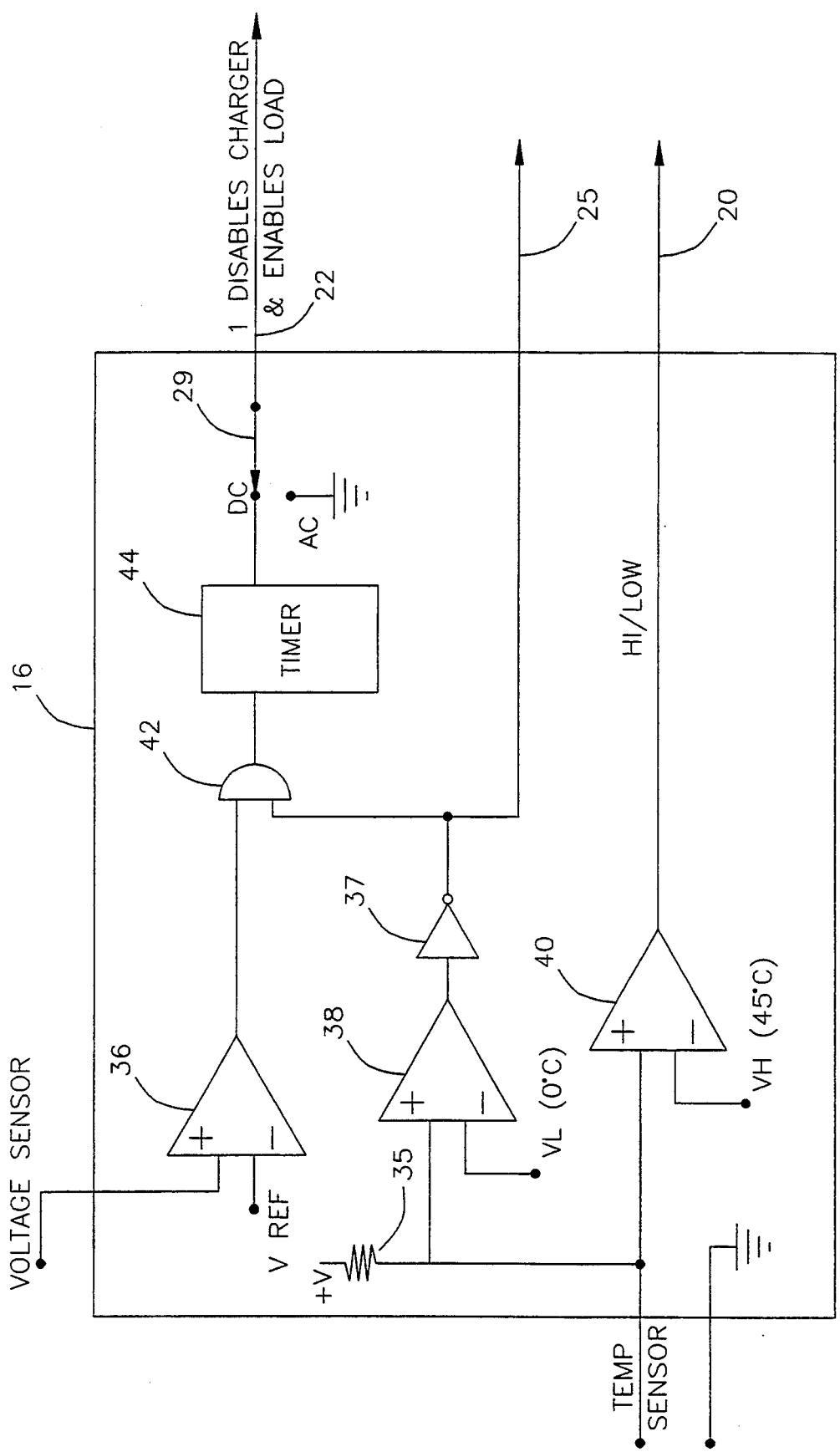
FIG. 4 is a schematic diagram of the temperature controller used in FIGS. 1, 2 and 3.

FIG. 4 is a schematic circuit diagram of the temperature controller 16 that is used in FIGS. 1, 2 and 3. It contains a reconfigurable jumper switch 29, which is set in position "DC" to cyclically disable DC charger 18 as described in conjunction with FIGS. 1 and 2, and is set in position "AC" to continuously enable AC heater power supply 27 in the embodiment of FIG. 3.

Comparator 36 senses battery charge level. The inverting input of comparator 36 is connected to a predetermined reference voltage, VREF which represents the battery voltage corresponding to a predetermined lower charge level. The non-inverting input of comparator 36 is connected to the positive terminal of battery 10. The output of comparator 36 is connected to an AND gate 42, the output of which is connected to the trigger control input of a timer 44.

Comparator 38 senses low battery temperature. The inverting input of comparator 38 is connected to a predetermined reference voltage V1, which represents the battery temperature corresponding to a low temperature level. The non-inverting input of comparator 38 is connected to receive the voltage output of temperature sensor 14, which increases with increasing temperature. The non-inverting input of comparator 38 is also connected to pullup resistor 35. The other end of pullup resistor 35 is connected to voltage source V, which has a higher potential than reference voltages V1 and Vh. Comparator 38 compares the voltage of temperature sensor 14 with the predetermined reference voltage corresponding to a temperature of approximately 0 degrees centigrade. The output of comparator 38 is connected to the input of an invertor 37, the output of which is connected to AND gate 42.

A comparator 40 detects high battery temperature. The non-inverting input of comparator 40 is connected to receive the voltage output of temperature sensor 14. The inverting input of comparator 40 is connected to a predetermined reference voltage Vh, which represents the battery temperature corresponding to a high temperature level, i.e., representing a temperature of approximately 45 degrees centigrade. By comparing the voltage of temperature sensor 14 with a predetermined reference voltage corresponding to a temperature of 45 degrees centigrade, the output of invertor 40 provides the high/low charge rate control signal 20, which causes charger 18 to charge at a high rate when it is a logical 0, and causes charger 18 to charge at a low rate when it is a logical 1.

Still referring to FIG. 4, the output of comparator 40 is used to set DC charger 18 to a low maximum charging rate, via input 20, when the temperature of battery 10 is above approximately 45 degrees centigrade. In the embodiment of FIG. 3, the output of invertor 37 enables AC heater power supply 27 using control output 25 when the temperature of battery 10 is below approximately 0 degrees centigrade.

In the embodiments of FIGS. 1 and 2, timer 44 causes charge cycling in this way: the output of timer 44 is normally 0, enabling the charger. If the temperature of battery 10 is less than approximately 0 degrees centigrade, the triggering input of timer 44 is enabled through AND gate 42. When the output of comparator 36 becomes a logical 1 as indicated in FIG. 5B, indicating that the battery is fully charged (and the temperature is below 0 degrees centigrade), timer 44 is triggered, beginning a 15 minute delay as illustrated in FIG. 5C. The triggering of timer 44 disables DC charger 18 via its output 22 and allows current from the battery to flow through resistor R, heating and discharging battery 10. As the battery discharges, the output of comparator 36 becomes a logical 0, indicating a less than fully charged state.

At the end of the 15 minute discharge cycle, timer 44 resets and DC charger 18 begins recharging battery 10, causing current to flow oppositely through resistor R, and further heating battery 10. The output of comparator 36 eventually returns to a logical 1, which begins the cycle again. The variation in the voltage of battery 10 during the charge and discharge cycle is illustrated in FIG. 5A.

While the above description contains many specifics, these should not be construed as limitations on the scope of the invention, but rather as examples of several of the many possible embodiments. Many other variations are possible. For example, the temperature sensor and auxiliary heater may be manufactured with the battery case, which may be made of a thermal insulating material. Also the battery may be non-rechargeable.

What is claimed is:

1. A method for controlling the temperature of a battery having first and second battery terminals and an internal resistance between said first and second battery terminals, comprising the steps of:
   (a) sensing the temperature of said battery to provide a sensed battery temperature;
   (b) comparing said sensed battery temperature to a predetermined temperature;
   (c) responsive to step (b) indicating that the temperature of said battery is less than said predetermined temperature, conducting a current between said first and second battery terminals through said battery;
   (d) sensing the charge level of said battery to provide a sensed battery charge level;
   (e) comparing said sensed battery charge level to a predetermined charge level; and
   (f) responsive to step (e) indicating that said sensed battery charge level is above said predetermined charge level and responsive to step (b) indicating that the temperature of said battery is less than said predetermined temperature, connecting a load across said first and second battery terminals.

2. A method in accordance with claim 1, comprising the additional steps of:
   (g) responsive to step (e) indicating that said sensed battery charge level is above said predetermined charge level and responsive to step (b) indicating that the temperature of said battery is less than said predetermined temperature, timing a predetermined time interval; and
   (h) connecting said load across said first and second battery terminals for said predetermined time interval.

3. A method in accordance with claim 2, comprising the additional step of:
   (i) disabling said step (c) of conducting a current between said first and second battery terminals through said battery during said predetermined time interval.

4. A method in accordance with claim 3, wherein said load comprises an auxiliary heating element in close proximity with said battery.

5. An apparatus for controlling the temperature of a battery wherein said battery has first and second battery terminals and an internal resistance between said first and second battery terminals, said apparatus comprising:
   means for sensing the temperature of said battery to provide a sensed battery temperature;
   means for comparing said sensed battery temperatures to a predetermined temperature;
   means for conducting a current between said first and second battery terminals through said battery, responsive to said means for comparing the temperature of said sensed battery temperature to said predetermined temperature indicating that the temperature of said battery is less than said predetermined temperature;

means for sensing the charge level of said battery to provide a sensed battery charge level;

means for comparing said sensed battery charge level to a predetermined charge level; and means for connecting a load across said first and second battery terminals responsive to said means for comparing said sensed battery charge level to said predetermined charge level indicating that said sensed battery charge level is above said predetermined charge level and responsive to said means for comparing said sensed temperature to said predetermined temperature indicating that the temperature of said battery is less than said predetermined temperature.

6. An apparatus in accordance with claim 5, further comprising:

means for timing a predetermined time interval responsive to said means for comparing said sensed battery charge level to said predetermined charge level indicating that said sensed battery charge level is above said predetermined charge level and responsive to said means for comparing said sensed temperature to said predetermined temperature indicating that the temperature of said battery is less than said predetermined temperature; and means for connecting said load across said first and second battery terminals for said predetermined time interval.

7. An apparatus in accordance with claim 6 further comprising:

means for disabling said means for conducting a current between said first and second battery terminals through said battery during said predetermined time interval.

8. An apparatus in accordance with claim 7, wherein said load comprises an auxiliary heating element in close proximity with said battery.

* * * * *